(12) United States Patent
Joki et al.

(10) Patent No.: US 6,659,650 B2
(45) Date of Patent: Dec. 9, 2003

(54) WHEEL BEARING WITH IMPROVED CAGE

(75) Inventors: Mark Joki, Dover, OH (US); Thomas J. Rybkoski, Uniontown, OH (US)

(73) Assignee: The Timken Company, Canton, OH (US)

( * ) Notice: Subject to any disclaimer, the term of this patent is extended or adjusted under 35 U.S.C. 154(b) by 13 days.

(21) Appl. No.: 10/058,631

(22) Filed: Jan. 28, 2002

(65) Prior Publication Data

US 2003/0142893 A1 Jul. 31, 2003

(51) Int. Cl.[7] .............................................. F16C 33/38
(52) U.S. Cl. ...................................... 384/572; 384/589
(58) Field of Search ................................. 384/589, 572, 384/575, 576, 577, 578, 581, 584, 580

(56) References Cited

U.S. PATENT DOCUMENTS

| | | | |
|---|---|---|---|
| 1,949,824 A | | 3/1934 | Buckwalter |
| 4,136,916 A | * | 1/1979 | Musselman et al. ......... 384/560 |
| 4,203,635 A | * | 5/1980 | Reiter ......................... 384/560 |
| 4,317,601 A | * | 3/1982 | Faigley, Jr. ................. 384/576 |
| 4,425,011 A | * | 1/1984 | Cunningham et al. ...... 384/571 |
| 4,435,024 A | * | 3/1984 | Tagawa et al. .............. 384/576 |
| 4,462,643 A | * | 7/1984 | Gilbert et al. .............. 384/576 |
| 4,522,516 A | * | 6/1985 | Neese ......................... 384/572 |
| 4,523,862 A | * | 6/1985 | Yasui et al. ................. 384/564 |
| 4,541,738 A | * | 9/1985 | Leibensperger et al. .... 384/470 |
| 4,783,182 A | * | 11/1988 | Caron et al. ................ 384/560 |
| 4,787,757 A | * | 11/1988 | Finger ........................ 384/470 |
| 4,824,265 A | * | 4/1989 | Hofmann et al. ........... 384/560 |
| 4,837,909 A | * | 6/1989 | Schalk .................. 29/898.061 |
| 4,907,898 A | * | 3/1990 | Dickinson ................... 384/564 |
| 4,974,972 A | * | 12/1990 | Boosler et al. ............. 384/447 |
| 5,022,768 A | * | 6/1991 | Baxter ......................... 384/19 |
| 5,125,756 A | * | 6/1992 | Bossler, Jr. ................. 384/572 |
| 5,136,777 A | * | 8/1992 | Brockmuller et al. ......... 29/725 |
| 5,189,791 A | * | 3/1993 | Alling .................... 29/898.067 |
| 5,199,801 A | | 4/1993 | Grehn et al. |
| 5,259,676 A | * | 11/1993 | Marti ......................... 384/474 |
| 5,482,150 A | * | 1/1996 | Stark .......................... 192/45 |
| 5,636,720 A | * | 6/1997 | Lederman ................... 192/45 |
| 5,651,438 A | * | 7/1997 | Papania ...................... 192/45 |
| 5,816,711 A | * | 10/1998 | Gingrich ..................... 384/488 |
| 5,860,747 A | * | 1/1999 | Wan et al. .................. 384/463 |
| 5,862,592 A | * | 1/1999 | Harimoto et al. ....... 29/898.067 |
| 5,897,215 A | * | 4/1999 | Mirring ...................... 384/564 |
| 5,911,458 A | * | 6/1999 | Bywalez et al. ........ 29/898.062 |
| 6,022,147 A | * | 2/2000 | Murai et al. ................ 384/574 |
| 6,135,643 A | * | 10/2000 | Hattori et al. .............. 384/589 |
| 6,238,098 B1 | * | 5/2001 | Knoll et al. ................. 384/572 |
| 6,287,015 B1 | | 9/2001 | Komaba et al. |

FOREIGN PATENT DOCUMENTS

| | | |
|---|---|---|
| EP | 0374111 | 6/1990 |
| EP | 0667530 | 8/1995 |
| EP | 0980985 | 2/2000 |

* cited by examiner

Primary Examiner—David A. Bucci
Assistant Examiner—Julie K. Smith
(74) Attorney, Agent, or Firm—Polster, Lieder, Woodruff & Lucchesi L.C.

(57) ABSTRACT

An improved cage is provided for a roller bearing for use in a hub assembly, for example. The cage includes roller pockets which fully entrap the roller in the cage, to maintain the radial and axial position of the roller in the cage. Additionally, the bearing for the hub assembly is formed in part by the hub. One of the inner races is formed integrally with the hub. These constructions allow for the cage/roller assembly to be installed in the outboard position of the hub prior to the hub and hub seal being installed in the hub assembly.

27 Claims, 4 Drawing Sheets

WHEEL BEARING WITH IMPROVED CAGE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates in general to hub assemblies for automotive vehicles and more particularly, to a new and improved cage for the bearing in the hub assembly to facilitate assembly of the hub assembly.

Many automotive vehicles of current manufacture have their road wheels coupled to their suspensions systems through hub assemblies which are supplied as package units ready for installation during the assembly of such vehicles. The typical hub assembly basically includes a housing of some type which is attached to a component of the suspension system for a vehicle, a hub to which the road wheel and also a brake rotor is secured, and a bearing between the hub and the housing to enable the hub to rotate relative to the housing with minimal friction. The bearing must accommodate thrust as well as radial loads and is preferably set to a condition of preload, so that the bearing operates without internal clearance; and the axis of rotation, as a consequence, remains stable. The typical hub has a spindle which extends into the bearing and a flange which projects radially from the spindle in front of the bearing and the housing which contains the bearing. The flange has parallel front and back faces which lie perpendicular to the axis of rotation and lead out to the very periphery of the flange. Threaded studs extend through the flange, projecting beyond its front face and through the brake rotor which is against the front face and the wheel which is against the brake rotor. The wheel and brake rotor are held against the front face of the flange by lug nuts which are threaded over the studs.

The wheel is typically supported on two rows of rolling elements with opposing angular contact to best oppose the moments placed on them in cornering. The wheel is typically attached to a hub on which bearing inner races are located. A suspension component that attaches to control arms, spring, and steering linkage (typically called a "knuckle") is the support for the bearing and the wheel. The bearing outer races are mounted to or within the knuckle. If the outboard inner race is an integral surface of the hub, and the rolling elements are tapered rollers, it is necessary to install the rollers to the hub with the cage holding the rollers inward. The necessity of installing the rollers first forces the seal to be pressed onto the non-rotating support where the tool must span a large radial distance in a very small axial space. The accuracy of seal placement cannot be assured with this tool design. When ball bearings are used, it is not necessary to install the balls on the inner race first. Due to their spherical shape, they can be easily held into a retainer that can be set into the outer race and the seal pressed without the hub being installed. This has not been possible with taper roller bearings.

BRIEF SUMMARY OF THE INVENTION

Briefly, an improved hub and an improved bearing cage are disclosed which will allow for easier assembly of hub assemblies. As is common, in a hub assembly for coupling a road wheel to the suspension system of an automotive vehicle, the hub assembly comprises a housing, a hub, and a bearing located between the housing and the hub for enabling the hub to rotate with minimal friction relative to the housing about an axis X. The improvement comprises not only the bearing, but the incorporation of an outer raceway for the bearing into the hub, such that the hub actually forms a part of the bearing.

The bearing includes an inner race, an outer race, a plurality of tapered rollers positioned between the inner and outer races, and a cage for maintaining the positions of the rollers relative to each other in the bearing.

In one aspect of the invention, the cage comprises a large end ring, a small end ring, and a plurality of bridges spaced about the cage. The large and small end rings and the bridges define a plurality of pockets which receive the rollers. The cage further includes a large end member at the large end ring and a small end member at the small end ring. The large and small end members engage the roller at respective ends of the roller. The large end ring, small end ring, bridges, large end members, and small end members define pockets which fully entrap the rollers.

The large end member comprises a post which extends axially from the large end ring into the pocket. The large end post is sized to be received in a recess formed in the large end of the roller.

The small end member includes a bottom restraint which extends radially inwardly from the bridge radial inner surface. The bottom restraint has a radial inner surface spaced radially inwardly of the small end ring radial inner surface, an axial bottom surface, and side walls. The respective side walls of the bottom restraints and bridges in combination defining a groove which is sized and shaped to radially restrain an axial end of the roller in the bearing. Preferably, the bottom restraint and bridge side surfaces are curved giving the groove a continuous uninterrupted and smooth curved surface. However, the side walls could be oppositely tapered walls, forming a generally V-shaped groove.

The bottom restraint and bridge, in combination, maintain the radial position of the small end of the roller in the cage. The large end ring does double duty—it both maintains the radial position of the large end of the roller in the cage and helps to maintain the axial position of the roller in the cage. The small end ring of the cage can also be provided with a small end post which extends axially into the pocket. The small end post is sized to engage the small end of the roller, and to work, in conjunction with the large end post, to maintain the axial position of the roller in the cage. If the roller is provided with a recess at its small end, the bottom restraint can be eliminated, and the two end posts, via their engagement with recesses in the ends of the roller, can operate to maintain the roller in the cage both axially and radially.

In another aspect of the invention, the hub assembly includes an inboard row of rollers and an outboard row of rollers, as well as inboard and outboard inner and outer races. At least one of the inboard and outboard inner races are formed integrally with the hub. Preferably, the outboard inner race is formed integrally with the hub, and the inboard inner race is formed in a cone received on the hub. With the outboard inner race being formed integrally with the hub, the hub also includes an integral thrust rib adjacent the outboard inner race.

The construction of the cage, and the formation of the outboard inner race as an integral part of the hub allows for the roller/cage assembly to be installed in the outboard position outer race before the seals and hub are installed in the hub assembly.

In an alternative embodiment of the hub, the hub includes a shoulder formed at the large end of the outboard inner race, the outboard inner race being integral with the hub. The cage includes a lip which extends from its large end ring and which is sized and positioned to engage the hub shoulder. The engagement of the cage lip with the hub shoulder restrains the cage against axial movement relative to the outboard inner race, yet allows the cage to rotate about an axis of the bearing assembly.

Another alternative construction for the cage is limited to the use of double row bearing assemblies. In such bearing assemblies, the bearing assembly comprising a double cup defining an inboard outer race and an outboard outer race, an inboard inner race and an outboard inner race; and an inboard row of rollers and an outboard row of rollers. The inboard and outboard row of rollers are held in inboard and outboard cages. The inner races can both be formed on cups. Alternatively, for use in the hub assembly of the present invention, one of the inner races (i.e., the outboard inner race) can be formed integrally with the hub spindle.

In another embodiment, for a double row bearing assembly, the inboard and outboard cages each include a connector extending radially from their respective small end rings. The connector includes a web extending from the small end ring of the cage and an end formation at an end of the web and which extends axially from the web. The connector of the inboard and outboard cages are positioned on the small end rings and are sized and oriented such that the end formations of the connector of the two cages engage each other to substantially prevent axial separation of the cages in the bearing assembly. Additionally, at least one of the connector is substantially circumferentially continuous, such that the end formations will not circumferentially catch each other, and the two cages can rotate relative to each other.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
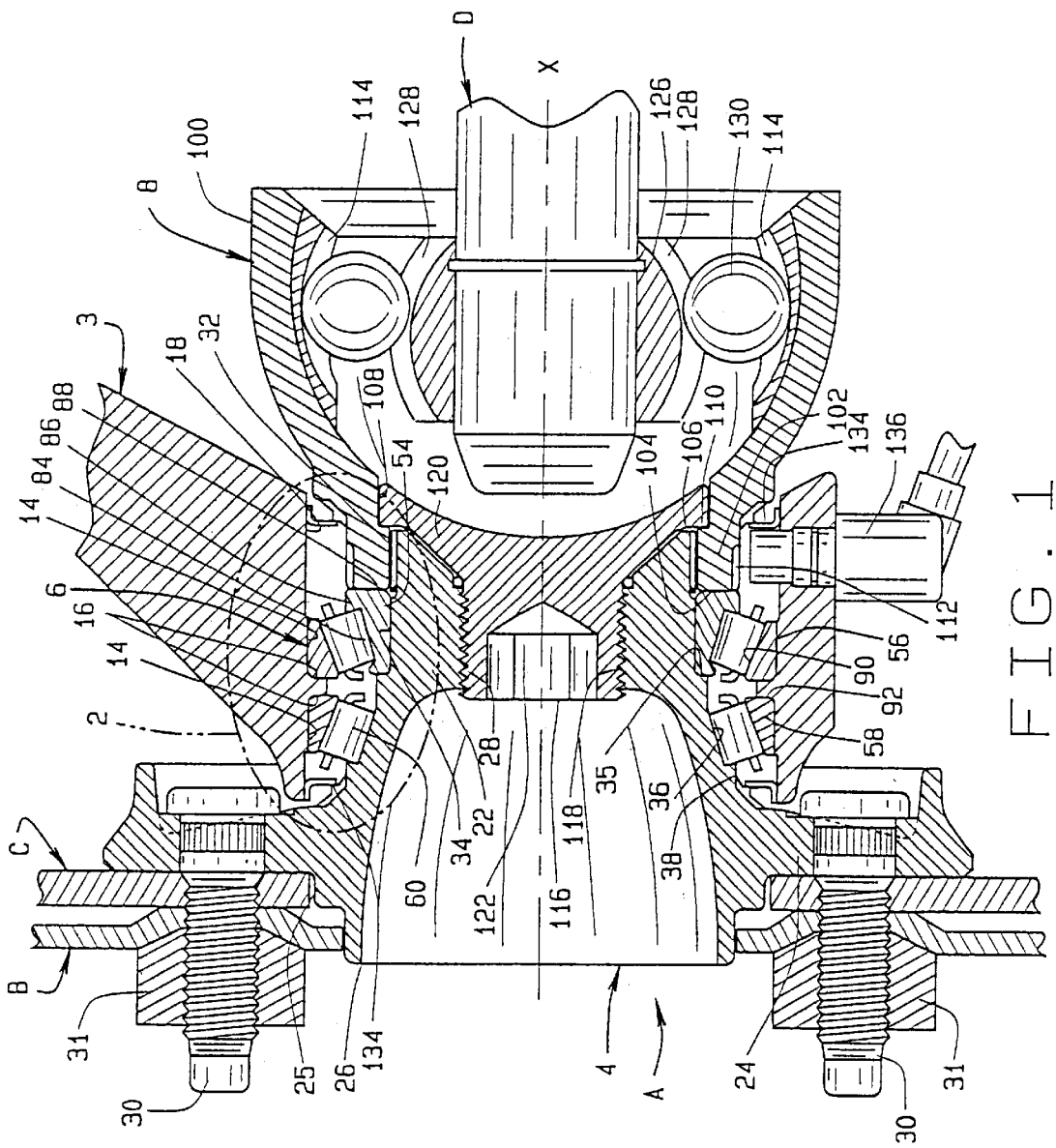
FIG. 1 is a longitudinal sectional view of a hub assembly constructed in accordance with and embodying the present invention.

The following detailed description illustrates the invention by way of example and not by way of limitation. This description will clearly enable one skilled in the art to make and use the invention, and describes what we presently believe is the best mode of carrying out the invention.

Referring now to the drawings (FIG. 1), a hub assembly A couples a road wheel B and brake rotor C for an automotive vehicle to the suspension system of the vehicle and may further couple the road wheel B to an axle shaft D forming part of the drive train for the vehicle. The suspension system includes (FIG. 1) a suspension member 3 that is designed to move generally vertically on the vehicle against the bias of a spring or torsion bar. Where the road wheel B that is coupled to the hub assembly A is at the front of the vehicle and thus steers the vehicle, the suspension member 3 typically takes the form of a steering knuckle. On the other hand, where the road wheel B is at the rear of the vehicle, the member 3 may take the form of a so-called "suspension upright". In addition, the hub assembly A includes a hub 4 which rotates in the member 3 on a bearing assembly 6 located between it and the member 3. Indeed, the bearing assembly 6 enables the hub 4, brake rotor C, and the road wheel B to rotate about an axis X that is fixed in position with respect to the member 3. The hub assembly A may also include a CV (constant velocity) joint 8 which couples the hub 4 with the axle shaft D.

Considering the suspension member 3 first, it serves as a housing for the bearing assembly 6 and to this end contains two bores 14 which receive the bearing assembly 6. The bores 14 lead up to shoulders 16 at their inner ends and at their outer ends open into counterbores 18 which in turn open out of the member 3. The member 3 may be a separate housing attached to a knuckle or suspension upright.

The hub 4 includes a spindle 22 which extends into the member 3 and a flange 24 which is formed integrally with the spindle 22 as a single casting or forging and lies outside the member 3. In addition, the hub 4 has a wheel pilot 26 which is also formed integrally with the flange 24 and projects forwardly beyond the flange 24 in the direction opposite that in which the spindle 22 projects. The hub 4 is hollow and, at the inboard end of the spindle 22, is provided with a threaded bore 28. Finally, the hub 4 contains threaded studs 30 which project through the flange 24 and forwardly from it. Indeed, the studs 30 pass through the brake rotor C and road wheel B, beyond which they are engaged by lug nuts 31 for securing the wheel B and rotor C to the hub 4.

Figure 2:
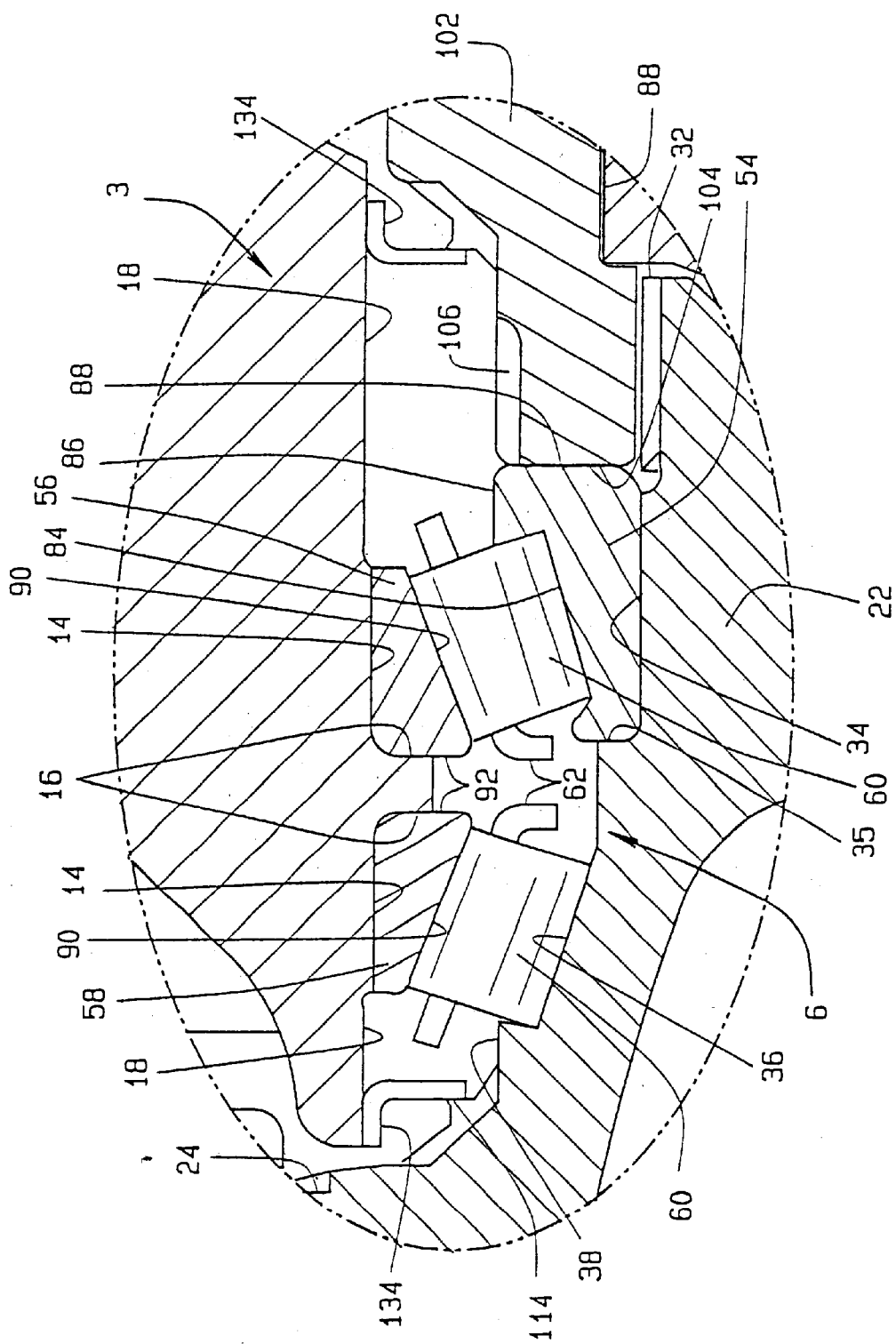
FIG. 2 is an enlarged fragmentary sectional view of the bearings of the present invention taken along the circle 2 of FIG. 1.

Turning to FIG. 2, the spindle 22 at its inboard end has an external spline 32 which leads up to a cylindrical bearing seat 34 of slightly greater diameter. The bearing seat 34 includes (or surrounds) the threaded bore 28 and lies with the inboard bore 14 of the suspension member 3. It leads up to a shoulder 35, beyond which the spindle 22 has a tapered raceway 36 that lies within the outboard bore 14 of the member 3. Preferably, the raceway 36 is integrally formed with the spindle 22. The small end of the raceway 36 is presented toward the bearing seat 34, its diameter being greater then the diameter of the seat 34, while its large end is located at a thrust rib 38 which leads out to the flange 24. The raceway 36 and thrust rib 38, while being integral with the spindle 22 of the hub 4, actually constitute art of the bearing assembly 6. The raceway 36 and thrust rib 38, while being integral with the spindle 22 of the hub 4, actually constitute part of the bearing assembly 6.

The bearing assembly 6 includes an outboard inner race in the form the raceway 36 and the thrust rib 38 on the spindle 22. A cone 54 located around the bearing seat 34 defines an inboard inner race 84. The bearing assembly also includes an inboard outer race 90 in the form of an inboard cup 56 around the cone 54 and an outboard cup 58 around the raceway 36 which forms an outboard outer race 90. Also, the bearing assembly 6 has rolling elements in the form of tapered rollers 60 arranged in two rows, there being a separate row within each cup 56 and 58. Finally, the bearing assembly 6 within each row of tapered rollers 60 includes a cage 62 for maintaining the proper spacing between the rollers 60.

Figure 3:
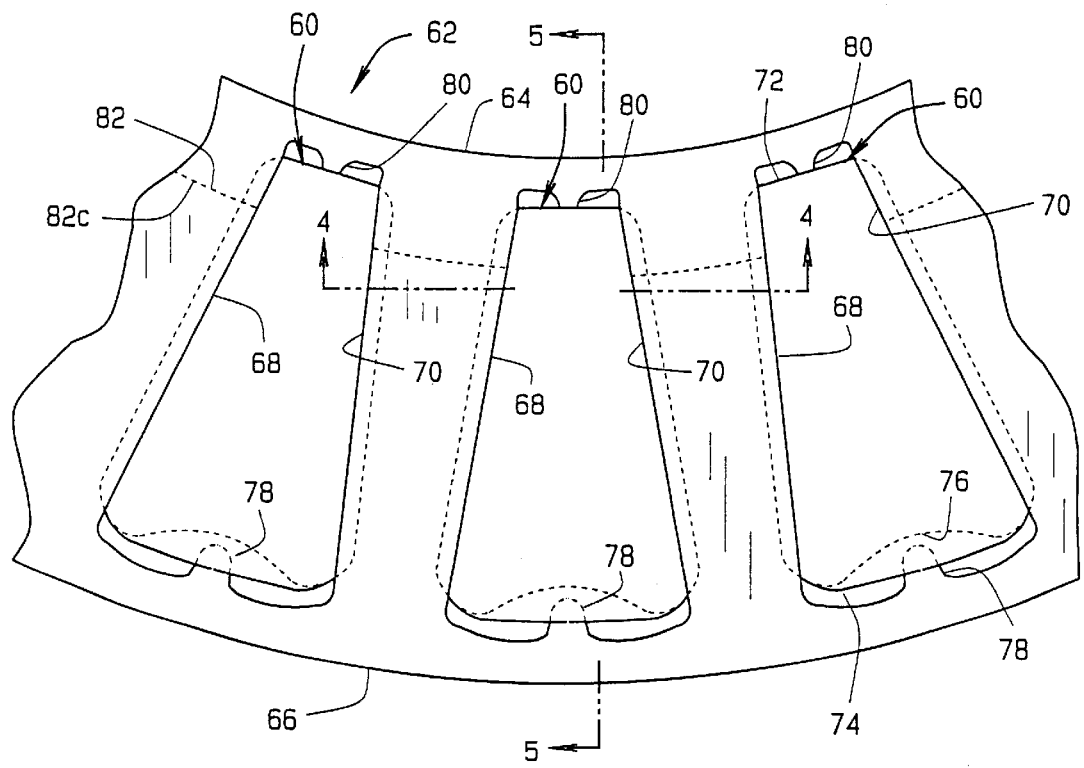
FIG. 3 is an enlarged fragmentary side elevational view of a roller cage of the present invention.
Figure 4:
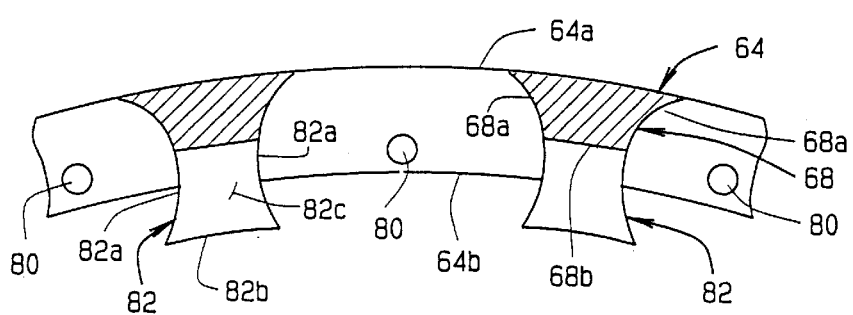
FIG. 4 is a cross-sectional view of the roller cage taken along line 4—4 of FIG. 3.

The cage 62 is shown in more detail in FIGS. 3 and 4. The cage 62 includes a small end ring 64 and a large end ring 66 separated by a plurality of bridges 68 spaced regularly about the cage. The bridges 68 have tapered (or slightly curved) side walls 68a and a radial inner surface 68b. The taper or curvature of the bridge side walls 68a preferably corresponds generally to the curvature of the rollers 60. The end rings 64 and 66 and bridges 68 in combination define pockets 70 which receive the tapered rollers 60. The tapered roller includes a small end 72 and a large end 74. The roller small end 72 is generally flat. A recess 76 is formed in the roller large end 76. The cage 62 includes a plurality of large end members 78 in the form of posts which extend from the large end ring 66 into the pockets 70. Preferably, the large end posts 78 are generally centered between the bridges 68 which define the sides of the pockets 70. A plurality of small end members 80 in the form of posts also extend into the pockets 70 from the small end ring 64. The small end posts 80, like the large end posts 68, are generally centered between the bridges 68.

As seen in FIG. 4, the bridges 68 extend from the radial outer edge 64a of the small end ring 64 to about the middle of the small end ring (i.e., the bridge radial inner surface 68b is about half way between the radial outer edge 64a and the radial inner edge 64b of the small end ring 64). The small end posts 80 are radially offset from the center of the small end ring 64, and are closer to the radial inner surface 64b of the end ring 64 than to the radial outer surface 64a of the small end ring. Additionally, the cage 62 includes a bottom restraint 82 which extends from the bridge radial inner surface 68b. The bottom restraint 82 has side walls 82a, a radial inner surface 82b, and a bottom surface 82c. As seen in FIG. 3, the bottom restraint 82 extends from the small end ring 64 towards the large end ring 66, such that its bottom surface 82c is spaced axially of the end of the small end post 80. The bottom restraint has a length substantially shorter than the length of the bridge. As seen in FIG. 4, the bottom restraint inner surface 82b extends radially inwardly of the small end ring bottom surface 64b. Hence, the bottom restraint 82 has an annular width greater than the annular width of the small end ring 64. Lastly, the side surfaces 82a of the bottom restraint are tapered (or slightly curved). As seen in FIG. 4, the curvature of the bottom restraint walls 82a is substantially the same as the curvature of the bridge walls 68a. The bridge 68 and bottom restraint 82, in combination, present a single curved surface, the curvature of which corresponds substantially to the curvature of the roller. curved surface, the curvature of which corresponds substantially to the curvature of the roller.

The pockets 70 fully encase with rollers 60 by the bottom restraints 82 at the small end ring and the large end ring posts 76 at the large end ring 66. Hence, when a roller 60 is received in a pocket 70, the large end post 78 in combination with the roller pocket 76, maintains the radial position of the large end of the roller; the bottom restraint 82 and bridge 68, in combination, maintain the radial position of the small end of the roller; and the small end post 80, which engages the small end of the roller and large end post, in combination, maintain the axial position of the roller in the cage.

Alternatively, if the roller included a recess at its small end, similar to the recess 76 at the roller's large end 74, the small end bottom restraint 82 could be substituted by the small end post 80. The small end post would then restrain radial movement of the rollers 60, and the small and large posts, in combination, would restrain the axial movement of the rollers.

A significant advantage of the cage 62 is that it can be injection molded from a resin, such as NYLON 66, such as is available from duPont under the trademark Zytel®, which will withstand the forces and conditions to which the bearing is subjected. The mold from which the cage is produced is preferably made to separate axially. The resin cures to be yieldable, so that the cage 62 can expand slightly to allow the rollers 60 to be snapped or popped into the pockets 70.

Returning to FIG. 2, the cone 54 fits around the bearing seat 34 with an interference fit. It has a tapered raceway 84 which is presented outwardly away from the axis X and a thrust rib 86 at the large end of the raceway 84. As noted above, the raceway 84 defines an inboard inner raceway of the bearing assembly 6. The thrust rib 86 leads out to a back face 88 which is at the inner end of the spline 32 where it is squared off with respect to the axis X.

Each cup 56, 58 has a tapered raceway 90 that is presented inwardly toward the axis X and a back face 92 at the small end of the raceway 90, with its back face 92 likewise being squared off with respect to the axis X. As noted above, the raceways 90 of the cups 56 and 58 define inboard and outboard outer raceways for the bearing assembly 6. The two cups 56 and 58 fit into the bores 14 of the member 3 with an interference fit and with their back faces 92 against the shoulders 16 at the ends of the bore 14. The raceway 90 on the inboard cup 56 faces and is inclined in the same direction as the raceway 84 on the cone 54; whereas the raceway 90 on the outboard cup 58 faces and is inclined in the same direction as the raceway 36 on the spindle 22.

The inboard row of tapered rollers 60 lies between the cone 54 and the inboard cup 56, where their tapered side faces contact the raceways 84 and 90 of the cone 54 and inboard cup 56, respectively, while their large end faces bear against the thrust rib 86 on the cone 54. The outboard row of tapered rollers 60 lies between the raceway 36 on the spindle 22 and the raceway 90 of the outboard cup 58, and the rollers 60 along their side faces contact those raceways 36 and 90. The large end faces of the rollers 60 of the outboard row bear against the thrust rib 38 on the spindle 22. The rollers 60 of each row are on apex, meaning that the conical envelopes of their side faces, as well as the conical envelopes for the raceways along which they roll, have their apices at a common point along the axis. Also, the inclination of the inboard raceways 84 and 90 is opposite that of the outboard raceways 36 and 90, so that the small ends of the rollers 60 in the inboard row are presented toward the small ends of the rollers 60 in the outboard row. This orientation enables the bearing assembly 6 to accommodate thrust loads in both axial directions. Moreover, the bearing assembly 6 is in a condition of preload so that no radial or axial clearances exist within it.

Turning to FIG. 1, the CV joint 8 couples the axle shaft D to the hub 4, thus enabling the road wheel B and brake rotor C to rotate with the shaft D. To this end, the CV joint 8 includes a shell 100 having a generally cylindrical end 102 which leads out to an end face 104 that is squared off with respect to the axis X. Internally, the cylindrical end 102 has a spline 106 which extends between the end face 104 and a counterbore 108, opening into the counterbore 108 at a shoulder 110. The cylindrical end 102 fits into the inboard counterbore 18 of the suspension member 3 and over the inboard end of the spindle 22 where its internal spline 106 engages the external spline 32 on the spindle 22. The end face 104 on the cylindrical end 102 bears against the back face 88 of the cone 54, while the shoulder 110 lies slightly beyond the inboard end of the spindle 22. Externally, the cylindrical end 102 has a target wheel 112 formed on it, and it constitutes a succession of disruptions arranged at equal circumferential intervals around the end 82. The target wheel 112 is located within the confines of the inboard counterbore 18 on the member 3 and typically includes a succession of axially directed grooves and teeth separating the grooves. Internally, the main body of the shell 100 contains several arcuate grooves 114.

The shell 100 of the CV joint 8 is secured to the hub 4 with a retainer 116 having a threaded plug 118 and a flange 120 directed outwardly from the plug 118. The thread on the plug 118 engages the threads of the threaded bore 28 in the spindle 22 of the hub 4, while the flange 120 lies within the shell 100 behind the shoulder 110. The plug 118 contains a socket 122 that opens into the hollow interior of the spindle hub 4, and the socket 122 is configured to receive a wrench for turning the retainer 116. When the retainer 116 is turned down, it draws the flange 120 tightly against shoulder 110 in the shell 100 of the CV joint 8. Thus, the retainer 116 captures the cylindrical end 102 of the shell 100 and the cone 54 of the bearing 6 on the spindle 22 of the hub 4.

In addition to the shell 100, the CV joint 8 has an inner member 126 provided with arcuate grooves 128 that open toward the grooves 114 on the shell 100 and balls 130 that are located in the grooves 114 and 128, and couple the inner member 126 to the shell 100. The axle shaft D is attached to the inner member 126.

The suspension member 3 within its counterbores 18 is fitted with seals 134. The seal 134 in the inboard counterbore 18 has an elastomeric element which bears against axially and radially directed surfaces on the shell 100 of the CV joint 8, whereas the seal 134 in the outboard counterbore 18 has a elastomeric element which bears against axially and radially directed surfaces on the hub 4. Thus, the seals 134 isolate the bearing 6, retaining a lubricant within it and excluding contaminants from it.

Finally, the suspension member 3 contains a sensor 136 which is presented toward the target wheel 112 and monitors the rotation of the target wheel 112. The sensor 136 produces a signal which reflects the angular velocity of the target wheel 112 and of course the angular velocity of the hub 4 and wheel B as well.

During assembly of the bearing assembly 6, the cage 62 of the present invention allows for the roller/cage assembly to be installed in the outboard outer race before the seal 134 and hub 4 are installed in the hub assembly A. Thus, the hub assembly A is put together as follows: The cups 56 and 58 are positioned in the suspension member knuckle 3 in the respective bores 14 with their back surfaces 92 adjacent the shoulders 16. The inboard roller/cage assembly with its associated cone 54 is place inside the inboard cup 56. The outboard roller/cage assembly is also positioned in the outboard cup 58. The outboard seal 134 is installed in the outboard counterbore 18 of the suspension member 3. Then, the hub 4, the outboard inner raceway 36, and spindle 22 is inserted into the housing 3 such that the spindle extends through the inboard cone 54. The CV joint shell 100 is then secured to the hub 4 via the retainer 116. The act of securing the CV joint 8 to the hub 4 will securely position the elements of the bearing assembly 6 in the hub assembly A to assure proper operation of the hub assembly A.

Figures 5, 6:
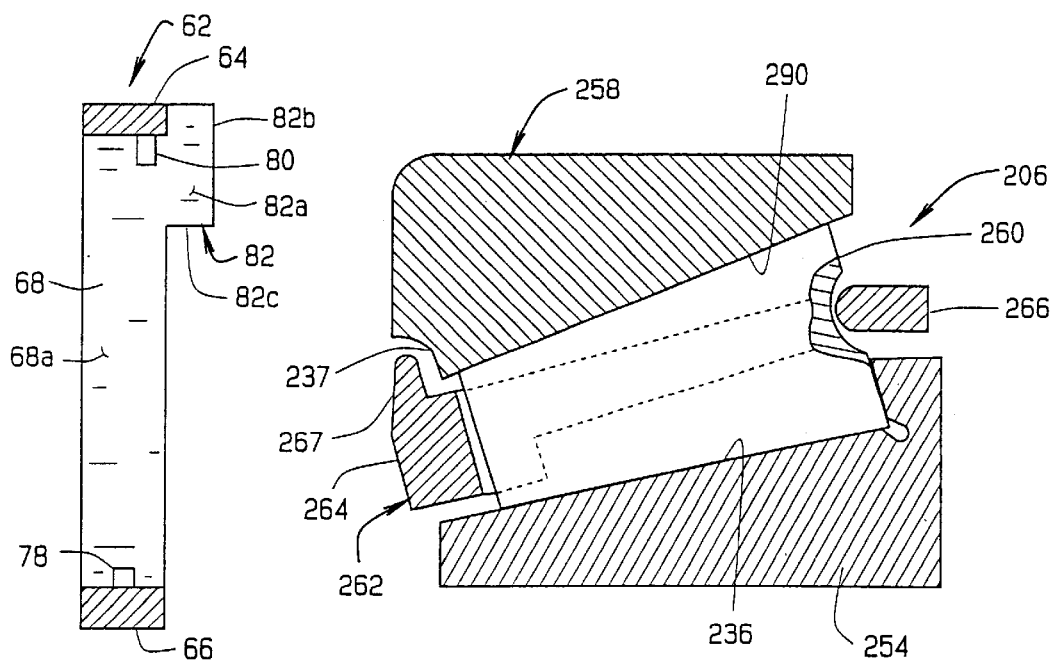
FIG. 5 is a cross-sectional view of the roller cage taken along line 5—5 of FIG. 3.
FIG. 6 is a cross-sectional view of an alternative cage configuration.

An alternative cage and cup configuration is shown in FIG. 6. In this embodiment, the cup 258 includes an outboard outer raceway 290 and a groove or shoulder 237 at the outboard edge of the raceway 290. The bearing assembly 206 further includes the outboard inner raceway 236 on an outboard cone 254, a plurality of roller elements 260 and a cage 262 which holds the roller elements 260. It will be appreciated that the outboard inner raceway 236 could be integrally formed with the hub, as is the raceway 36 in FIGS. 1 and 2. In this instance, the cone 254 would not be required.

The cage 262 includes a small end ring 264 and a large end ring 266 separated by a plurality of bridges spaced regularly about the cage. The end rings 264 and 266 and bridges in combination define pockets which receive the tapered rollers 260. The cage 262 however additionally includes a rim 267 at the small end ring 264 which is sized and positioned to engage the shoulder 237 of the cup 258. Otherwise, the cage 262 is formed similarly to the cage 62 of FIGS. 3–4. When the cup 258 is applied to the cage 262 with bearings 260 and the cone 254, the engagement of the cage rim 267 with the cup shoulder 237 will serve to axially retain the outer bearing race 290 in the cup, but allow the outer bearing race to rotate freely about the axis of the bearing.

Figure 7:
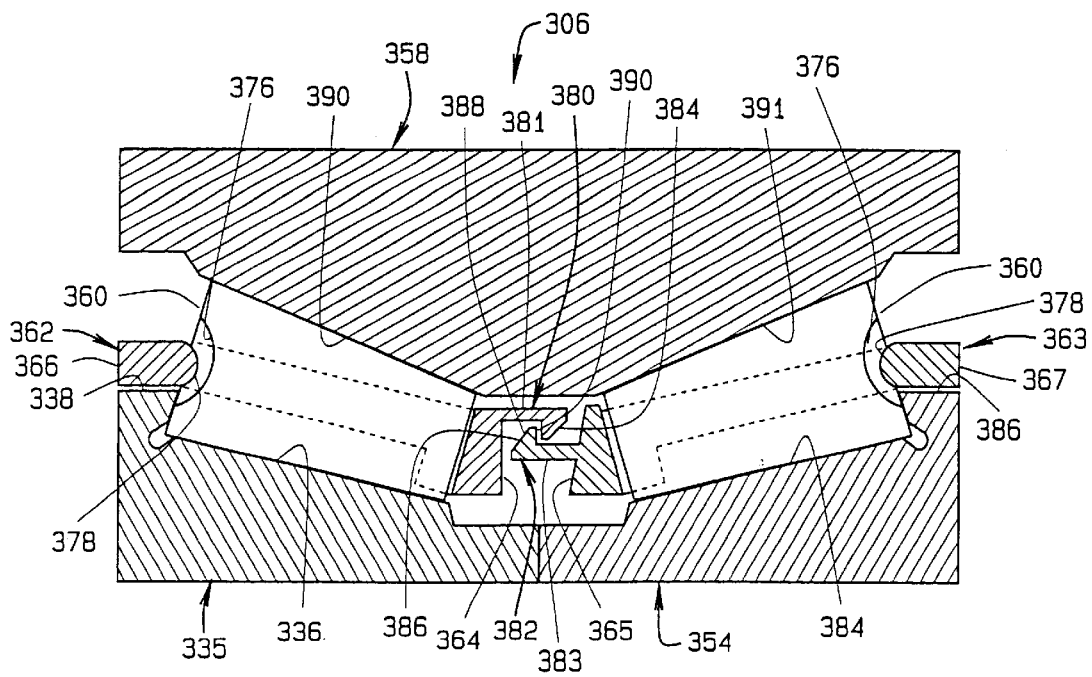
FIG. 7 is a cross-sectional view of a second alternative cage configuration.

An alternative roller assembly 306 is shown in FIG. 7. The roller assembly 306 is a preset double row bearing assembly. It includes an outboard cone 335 and an inboard cone 354 which form outboard and inboard inner raceways 336 and 384, respectively. The cones 335 and 354 each have a small end and a large end, such that the raceways are tapered. Thrust ribs 338 and 386 are formed at the large ends of the cones 335 and 354, respectively. The cones are positioned such that the small ends are adjacent each other and the large ends are remote from each other. Thus, the outboard inner raceway 336 and the inboard inner raceway 384 face each other. As can be appreciated, the outboard cone 335 can be incorporated into the spindle of the hub, such that the outboard inner raceway 336 is integral with the hub spindle, as is the outboard inner raceway 36 of the bearing assembly 6 (FIGS. 1 and 2). The bearing assembly 306 also includes a double cup 358 which forms an outboard outer raceway 390 and an inboard outer raceway 391. The outboard and inboard raceways each have a small end and a large end, with the small ends being adjacent each other, and the large ends being remote from each other, such that the two outer raceways are tapered, and face away from each other.

Two rows of rollers 360 in the form of tapered rollers, are positioned between the respective inner and outer raceways of the bearing assembly. The inboard row of tapered rollers 360 lies between the cone 354 and the inboard side of the cup 358, where their tapered side faces contact the raceways 384 and 391, respectively, while their large end faces bear against the thrust rib 386 on the cone 354. The outboard row of tapered rollers 360 lies between the raceway 336 of the cone 335 and the raceway 390 of the cup 358, and the rollers 360 along their side faces contact those raceways 336 and 390. The large end faces of the rollers 360 of the outboard row bear against the thrust rib 338 on the cone 335. The rollers 360 of each row are on apex. Also, the inclination of the inboard raceways 384 and 391 is opposite that of the outboard raceways 336 and 390, so that the small ends of the rollers 360 in the inboard row are presented toward the small ends of the rollers 360 in the outboard row. This orientation enables the bearing assembly 306 to accommodate thrust loads in both axial directions. Moreover, the bearing assembly 306 is in a condition of preload so that no radial or axial clearances exist within it.

The outboard row of rollers is contained by a first cage 362, and the inboard row of rollers is contained by a second cage 363. As will be explained below, the two cages engage each other, thereby holding the two cages against axial separation while allowing axial rotation of the cages relative to each other.

The two cages 362 and 363 each include small end rings 364 and 365, respectively, and large end rings 366 and 367, respectively. A plurality of bridges (not shown) extend between the large and small ends of the cages to define pockets in which the rollers are contained. The bridges and pockets of the cages 362 and 362 are formed similarly to the bridges and pockets of the cage 62 of FIGS. 3–5. A member 378 in the form of a post extends into the pocket from the large end 366, 367 of each cage to engage a depression 376 in the large end of the roller 360. The small ends of the rollers abut the inner surface of the small end rings 364, 365.

The first and second cages each include connectors 380 and 382, respectively, extending axially from the outer surface of their small end rings 364 and 365. The connectors 380, 382 each include a web 381 and 383, respectively with an end formation 384, 386, respectively, at the ends of the webs. The end formations 384 and 386 each have a flat inner surface 388 and a sloped outer surface 390. The connectors of the two cages are positioned such that the end formations 384 and 386 of the two cages will engage each other when the bearing assembly 306 is assembled. Hence, the first cage connecter 380 is shown to be positioned along the radial outer surface of the small end ring 364, with the end formation 384 facing radially inwardly; and the second cage connector 382 is positioned at the approximate center of the small end ring 365 with its end formation 386 facing radially outwardly. Thus, connectors 380 and 382 are oriented such that their respective end formations extend toward each other and are positioned such that the end formations will engage each other, as seen in FIG. 6, to hold the two cages against axial movement relative to each other.

Preferably at least one of the connectors 380 and 382 is substantially circumferentially continuous. That is, it forms a complete ring around the small end of the respective cage. The other connector can be circumferentially continuous or discontinuous. If the other connector is circumferentially discontinuous, it will flex more easily, allowing for easier assembly of the bearing assembly. As can be appreciated, the circumferentially continuous connector will form a flange around the small end of the cage, with a rib at the end of the flange; the rib being defined by the end formation of the connector. If the other connector is discontinuous, it will define a plurality of arms (defined by the connector web) extending outwardly from the small end of the cage, and the end formations would define fingers at the ends of the arms. By having one of the connectors being circumferentially continuous, the possibility of the end formations of the connectors catching each other and impeding rotation of the two cages relative to each other will be eliminated.

As various changes could be made in the above constructions without departing from the scope of the invention, it is intended that all matter contained in the above description or shown in the accompanying drawings shall be interpreted as illustrative and not in a limiting sense. For example, the outer raceways 90 of the bearing 6 may be formed on a housing that is attached to or part of the suspension member 3, in which event the separate cups 56 and 58 are eliminated.

The inner raceway 36 and its thrust rib 38 may be on a separate cone fitted to the spindle 22 of the hub 4 much like the cone 54. The bearing 6 may be an angular contact ball bearing instead of a tapered roller bearing, in which event the raceways, while being generally inclined to axis X, are arcuate, and the rolling elements are spherical. The bridge and bottom restraint side surfaces could be oppositely tapered, rather than curved, surfaces, which define a generally V-shaped groove rather than a continuous arced groove. The taper and size of the bottom restraint and bridge side surfaces, would still be sized to receive the small end of the roller and restrain radial movement of the roller. The small end post 80 can be eliminated, and the function of maintaining the axial position of the roller in the cage can be accomplished by the large end post 78 by itself, by properly sizing the large end post. These variations are illustrative only.

What is claimed is:

1. In a hub assembly for coupling a road wheel to the suspension system of an automotive vehicle, said hub assembly comprising: a housing; a hub; and a bearing assembly located between the housing and the hub for enabling the hub to rotate with minimal friction relative to the housing about an axis X; the improvement comprising said bearing assembly; said bearing assembly comprising:

an inner race, an outer race, a plurality of rollers positioned between said inner and outer races; and a cage for maintaining the positions of said rollers relative to each other in said bearing; said cage comprising a large end ring, a small end ring, and a plurality of bridges spaced about said cage; said bridge including a radial inner surface spaced between said radial inner and outer edges of said small end ring: said large and small end rings and said bridges defining a plurality of pockets which receive said rollers; said cage further comprising:

a large end member at said large end ring which engages one axial end of said roller to prevent said roller from moving axially and radially in said pocket; and a bottom restraint extending radially inwardly from said bridge radial inner surface and axially from said small end ring a distance substantially less than the length of said bridge; said bottom restraint comprising a radial inner surface spaced radially inwardly of said small end ring radial inner surface; said bottom restraint and said bridge each having side walls; the respective side walls of said bottom restraints and bridges in combination defining a groove having a width less than the diameter of said roller at its second axial end and being sized and shaped to radially restrain said second axial end of the roller in said bearing;

whereby said large end ring, small end ring, bridges, large end members, and said bottom restraints co-operate to fully entrap said rollers in said pockets and to prevent said rollers from escaping from said cage in a radial or axial direction.

2. The improvement of claim 1 wherein said large end member includes a post extending from said large end ring into said pocket; said roller including a large end having a recess formed therein; said post being received in said recess.

3. The improvement of claim 1 wherein said cage includes a small end post extending from said small end ring into said pocket; said roller including a small end having a recess formed therein; said small end post being received in said recess.

4. The improvement of claim 1 wherein said bottom restraint and bridge side surfaces are curved giving said groove a continuous uninterrupted and smooth curved surface.

5. The improvement of claim 1 including a small end post extending from said small end ring into said pocket; said post being sized to engage a small end of said roller.

6. The improvement of claim 1 wherein said rollers comprise a first row of rollers and a second row of rollers; one of said rows of rollers being an outboard row of rollers and the other being an inboard row of rollers; said inner and outer races comprising an inboard and an outboard inner race and an inboard and an outboard outer race, respectively; at least one of said inboard and outboard inner races being integral with said hub.

7. The improvement of claim 6 including a cone; said cone defining said inboard inner race; said outboard inner race being integral with said hub.

8. The improvement of claim 6 wherein said hub assembly includes an integral thrust rib adjacent said outboard inner race.

9. The improvement of claim 6 wherein said hub includes a shoulder at a large end of said race which is integral with said hub; said cage including a lip extending from said large end ring; said lip being sized and positioned to engage said hub shoulder; the engagement of said cage lip with said hub shoulder restraining said cage against axial movement relative to said integral race, yet allowing said cage to rotate about an axis of said bearing assembly.

10. The improvement of claim 1 wherein said bearing assembly is a double row bearing assembly; said bearing assembly comprising a double cup defining an inboard outer race and an outboard outer race; an inboard inner race and an outboard inner race; and said plurality of rollers, said rollers defining an inboard row of rollers and an outboard row of rollers; said outer race comprising one of said inboard and outboard outer races; said inner race comprising one of said inboard and outboard inner races; said inboard row of rollers being contained in a first cage; and said outboard row of rollers being contained in a second cage.

11. The improvement of claim 10 wherein one of said inboard and outboard inner races is integral with said hub; the other of said inboard and outboard inner races being formed by a cone.

12. The improvement of claim 10 wherein said first and second cages each include a connector extending radially from their respective small end rings; said connector including and an end formation extending axially from an end of said connector; the connectors of said first and second cages being positioned on said small end rings and sized and oriented such that said end formations of said connectors of said first and second cages engage each other to substantially prevent axial separation of said cages in said bearing assembly.

13. The improvement of claim 12 wherein at least one of said connectors is circumferentially continuous; the engagement of said end formations allows for said cages to rotate relative to each other.

14. The improvement of claim 1 wherein said inner race is formed integrally with said hub.

15. A roller bearing assembly comprising: an inner race, an outer race, a plurality of rollers positioned between said inner and outer races; and a cage for maintaining the positions of said rollers relative to each other in said bearing; said cage comprising a large end ring, a small end ring, and a plurality of bridges spaced about said cage; said large and small end rings and said bridges defining a plurality of pockets which receive said rollers; said cage further comprising a large end member at said large end ring which engages said roller at a first axial end of said roller to radially restrain said roller at its first axial end and a bottom restraint which engages said roller at a second axial end of said roller to radially restrain said roller at its second axial end;

said bottom restraint comprising side walls extending radially from said bridge and axially from said cage small end ring; said bottom restraint walls having a length substantially less than the length of said bridge; the side walls of adjacent bottom restraints defining a groove having a width less than the diameter of said roller at its second axial end such that said bottom restraint radially restrains said roller in said cage at said roller's second axial end;

whereby, said roller is retained against substantial radial movement only at said roller's opposed axial ends, such that said roller cannot escape from said cage in a radial direction.

16. The bearing of claim 15 wherein said large end member includes a post extending from said large end ring into said pocket; said roller including a large end having a recess formed therein; said post being received in said recess.

17. The bearing of claim 15 wherein said cage includes a small end post extending from said small end ring into said pocket; said roller including a small end having a recess formed therein; said small end post being received in said recess.

18. The bearing of claim 15 wherein said bridge includes a radial inner surface spaced between radial inner and outer edges of said small end ring; said bottom restraint extending radially inwardly from said bridge radial inner surface; said bottom restraint having a radial inner surface spaced radially inwardly of said small end ring radial inner surface such that the combined radial height of said bridge and bottom restraint side walls is greater than the radial height of said cage small end ring.

19. The bearing of claim 18 wherein said bottom restraint and bridge side surfaces are curved giving said groove a continuous uninterrupted and smooth curved surface.

20. The bearing of claim 18 including a small end post extending from said small end ring into said pocket; said post being sized to engage a small end roller.

21. The bearing of claim 15 wherein said bearing assembly is a double row bearing assembly; said bearing assembly comprising a double cup defining an inboard outer race and an outboard outer race; an inboard inner race and an outboard inner race; and said plurality of rollers, said rollers defining an inboard row of rollers and an outboard row of rollers; said outer race comprising one of said inboard and outboard outer races; said inner race comprising one of said inboard and outboard inner races; said inboard row of rollers being contained in a first cage; and said outboard row of rollers being contained in a second cage.

22. The bearing of claim 21 wherein said first and second cages each include a connector extending radially from their respective small end rings and including an end formation extending axially from an end of said connector; the connectors of said first and second cages being positioned on said small end rings and sized and oriented such that said end formations of said connectors of said first and second cages engage each other to substantially prevent axial separation of said cages in said bearing assembly.

23. The bearing of claim 22 wherein the engagement of said end formations allows for said cages to rotate relative to each other.

24. A cage for a roller bearing having a plurality of rollers; the cage comprising:
- a first end ring, a second end ring, and a plurality of bridges spaced about said cage; said first and second end rings and said bridges defining a plurality of pockets sized to receive rollers; said bridge having a radial inner surface and side walls, said end rings having radial inner surfaces and radial outer surfaces;
- a first end member at said first end ring adapted to engage said rollers at a first end of said rollers; and a second end member at said second end ring, said first and second end ring members being sized to retain a roller's axial position in said cage; and
- a bottom restraint which extends radially inwardly from said bridge radial inner surface and axially from said second end ring; said bottom restraint having an axial length substantially less than the length of said bridge; the respective side walls of said bottom restraints and bridges in combination defining a grooves which are sized and shaped to engage a roller at a second axial end of the roller;
- whereby, said first and second end members engage said rollers to prevent substantial axial movement of said rollers relative to said cage; and whereby said rollers are engaged only at their axial ends by said first end member and said bottom restraint to prevent substantial radial movement of said rollers relative to said cage.

25. The roller bearing cage of claim 24 wherein said first and second end members are posts extending from said first end ring and second end ring, respectively into said pocket.

26. The roller bearing cage of claim 24 wherein said bottom restraint and bridge side surfaces are curved giving said groove a continuous uninterrupted and smooth curved surface.

27. A cage for a roller bearing having a plurality of rollers; the cage comprising:
- a first end ring, a second end ring, and a plurality of bridges spaced about said cage; said first and second end rings and said bridges defining a plurality of pockets sized to receive rollers; said bridge having a radial inner surface and side walls, said end rings having radial inner surfaces and radial outer surfaces
- a first end member at said first end ring adapted to engage a roller at a first axial end of the roller; and
- a bottom restraint which extends radially inwardly from said bridge radial inner surface and axially from said second end ring; said bottom restraint having an axial length substantially less than the length of said bridge; the respective side walls of said bottom restraints and bridges in combination defining a grooves which are sized and shaped to engage a roller at a second axial end of the roller;
- whereby, when rollers are positioned in said cage, the rollers are engaged only at their axial ends by said first end member and said bottom restraint; said first end member and bottom restraint preventing substantial radial movement of said rollers relative to said cage to prevent the rollers from escaping from said cage in a radial direction.

* * * * *

UNITED STATES PATENT AND TRADEMARK OFFICE
CERTIFICATE OF CORRECTION

PATENT NO.     : 6,659,650 B2
DATED          : December 9, 2003
INVENTOR(S)    : Mark Joki and Thomas J. Rybkoski It is certified that error appears in the above-identified patent and that said Letters Patent is hereby corrected as shown below:

<u>Column 4,</u>
Line 60, delete "The raceway 36 and thrust rib 38, while being integral with the spindle 22 of the hub 4, actually constitute part of the bearing assembly 6."

<u>Column 5,</u>
Line 56, after "roller", add a period. After the period delete "curved surfaces, the curvature of which corresponds substantially to the curvature of the roller."

Signed and Sealed this

Sixth Day of July, 2004

JON W. DUDAS
*Acting Director of the United States Patent and Trademark Office*